F. C. KRÜGER.
WEDGE EXPANDING DEVICE.
APPLICATION FILED OCT. 15, 1909.
956,712.
Patented May 3, 1910.
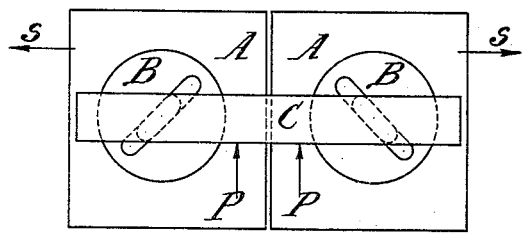
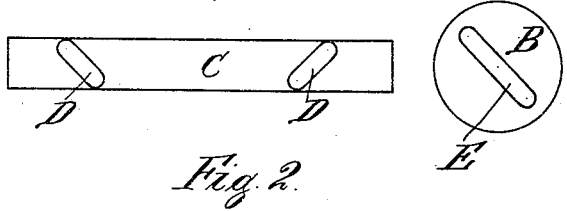
Witnesses:
Alfred Lyons.
Grey M. Hessler
Inventor:
Friedrich Carl Krüger
by L. K. Böhm,
Attorney

UNITED STATES PATENT OFFICE.

FRIEDRICH CARL KRÜGER, OF HANOVER, GERMANY.

WEDGE-EXPANDING DEVICE.

956,712. Specification of Letters Patent. Patented May 3, 1910.

Application filed October 15, 1909. Serial No. 522,765.

*To all whom it may concern:*

Be it known that I, FRIEDRICH CARL KRÜGER, a citizen of the German Empire, and resident of 1 Waldstrasse, Hanover, in the German Empire, have invented a new and Improved Wedge-Expanding Device, of which the following is a specification.

This invention relates to a device for expanding a body composed of separate relatively movable parts or for altering the distance apart of two bodies. It may also be used for prising apart different bodies or ends of the same body.

The invention will be more readily understood from the following description of a suitable form, as illustrated in the accompanying drawings.

In the drawings Figure 1 represents the invention somewhat diagrammatically in plan, Fig. 2 is a view of the wedge-piece looking from below in Fig. 1. Fig. 3 is a detached view of the grooved plate hereinafter described.

In carrying the invention into effect according to the form illustrated the two parts A A are adapted to be moved relatively to one another in the direction of the arrows S S, when a force is applied to the wedge-piece C in the direction of the arrows P P. In the form illustrated a plate B is let into each of the parts A A. The plate B is circular and is loosely rotatable in its seat in the part A. On the wedge-piece C there are formed projections D D adapted to fit in the grooves E E in the plates B. The projections D D are so shaped that when the plate C is moved in the direction of the arrows P P the bodies A A are moved in the direction of the arrows S S.

With this device the projections D D and the plates B B may be made of suitable hard material and these parts, that is the plates B and the projections D may be easily replaced. Further owing to the fact of the groove carrying members B being movable independently of the guidance of the bodies A A, the said plates B may adjust themselves into the exact position to suit the angle at which the projections D D are arranged. It is thus impossible for the projections D D to become jammed in their working grooves.

I claim:—

1. In combination an expansible body composed of parts relatively movable, circular grooved pieces movably arranged in said parts, and a member having inclined projections engaging in said grooves and adapted to coöperate with said grooves to separate the parts of the expansible body.

2. In combination two movable parts, circular plates sunk in said parts, said plates being capable of rotation and provided with grooves, a member having projections engaging in the grooves of said rotable plates, said projections being set at an angle to cause relative motion of the parts when the member carrying the same is moved, substantially as described.

3. In a wedge expanding device having two movable parts with circular incisions, a loose circular plate with a central groove in each incision, and an operative member with projections set at an angle adapted to engage in the grooves of the circular plates.

In witness whereof I have hereunto set my hand in the presence of two witnesses.

FRIEDRICH CARL KRÜGER.

Witnesses:
  E. T. HUTCHINGS,
  R. SOMMERHOFF.